(12) United States Patent
Kitagawa et al.

(10) Patent No.: US 6,590,732 B2
(45) Date of Patent: Jul. 8, 2003

(54) SERVO TRACK WRITER FOR MAGNETIC DISKS

(75) Inventors: Katsuyoshi Kitagawa, Akishima (JP); Hiroyuki Kuno, Fujisawa (JP); Yasuo Motegi, Kawasaki (JP); Tetsuzo Toya, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 264 days.

(21) Appl. No.: 09/769,535

(22) Filed: Jan. 26, 2001

(65) Prior Publication Data

US 2001/0010607 A1 Aug. 2, 2001

(30) Foreign Application Priority Data

Jan. 28, 2000 (JP) ........................................ 2000-020298

(51) Int. Cl.[7] .............................. G11B 21/02; G11B 5/09; G11B 14/02
(52) U.S. Cl. .............................. 360/75; 360/69; 360/51
(58) Field of Search ........................ 360/75, 51, 78.04, 360/78.12, 69, 97.01, 254; 364/176, 177, 191, 192, 249

(56) References Cited

U.S. PATENT DOCUMENTS

| 6,229,664 B1 | * | 5/2001 | Albrecht et al. | ............... | 360/75 |
| 6,404,580 B1 | * | 6/2002 | Fioravanti | ..................... | 360/75 |
| 2002/0046607 A1 | * | 4/2002 | Hagiwarwa | .................. | 73/593 |

FOREIGN PATENT DOCUMENTS

JP          8-124336         5/1996

* cited by examiner

*Primary Examiner*—Andrew L. Sniezek
(74) *Attorney, Agent, or Firm*—Pillsbury Winthrop LLP

(57) ABSTRACT

A disk assembly, which includes a large number of magnetic disks arranged in layers on a disk loading hub, is detachably mounted on a rotating shaft of an air spindle motor that is set on a base. The base has thereon a movable table capable of reciprocation. The movable table carries thereon a rotary positioner for rotating and positioning a stacked head assembly, which is formed of a large number of magnetic heads stacked in layers, and a plurality of ramps for loading into and unloading the magnetic heads from the magnetic disks. The distance between the respective rotating shafts of the air spindle motor and the rotary positioner can be adjusted by moving the movable table.

12 Claims, 4 Drawing Sheets

SERVO TRACK WRITER FOR MAGNETIC DISKS

CROSS-REFERENCE TO RELATED APPLICATIONS

This application is based upon and claims the benefit of priority from the prior Japanese Patent Application No. 2000-020298, filed Jan. 28, 2000, the entire contents of which are incorporated herein by reference.

BACKGROUND OF THE INVENTION

The present invention relates to an information writing device for writing desired information in disk-shaped information storage media such as magnetic disks.

A hard disk drive, as an example of an information storage apparatus provided with disk-shaped information storage media, comprises a casing in the form of an open-topped rectangular box and a top cover that is fastened to the casing by means of screws and closes a top opening of the casing.

The casing contains therein magnetic disks for use as information storage media, a spindle motor for supporting and rotating the magnetic disks, magnetic heads for writing in and reading information from the magnetic disks, a head actuator that supports the magnetic heads for movement with respect to the magnetic disks, a voice coil motor for rotating and positioning the head actuator, and a substrate unit including a head IC and the like. A printed-circuit board for controlling the respective operations of the spindle motor, voice coil motor, and magnetic heads is screwed to the outer surface of the bottom wall of the casing with the substrate unit between them.

The hard disk drive constructed in this manner is shipped after desired servo information is written in the magnetic disks after assembly. Normally, the servo information is written in the following manner. More specifically, a rotary positioner is mounted on the head actuator after the hard disk drive is assembled. The rotary positioner includes a rotating shaft coaxial with the rotating shaft of the head actuator and a push pin for pushing and rotating the head actuator. The push pin is pressed against a side face of the head actuator in a manner such that the magnetic disks are rotated at a given speed by means of the spindle motor of the hard disk drive as the rotary positioner is rotated for a given angle. By doing this, the head actuator is rotated so that magnetic heads are moved in the radial direction of the magnetic disks. In this state, predetermined servo information is written in the magnetic disks by means of the magnetic heads. Thereafter, the magnetic heads are successively moved to predetermined positions by means of the rotary positioner, and the servo information is written in regular sequence.

The following problems will be aroused, however, if the servo information is thus written in the magnetic disks that are incorporated in the hard disk drive. In general, a spindle motor of a hard disk drive uses a ball bearing, so that its shaft slight moves as it is driven. If the magnetic disks are rotated by means of this spindle motor as information writing operation is carried out, therefore, the movement of the motor shaft is inevitably recorded as deflection of tracks for servo information that is written in the magnetic disks. More specifically, the shaft movement of the spindle motor is not synchronous with the rotation of the magnetic disks, and the tracks for the written servo information fail to be perfectly circular.

Further, the engagement between the push pin of the rotary positioner and the head actuator is based only on the offset force of the head actuator and can be influenced by friction and sympathy between the push pin and the head actuator. It is difficult, therefore, to improve the positioning accuracy for the magnetic heads.

Thus, it is hard to write servo information accurately in the magnetic disks that are incorporated in the hard disk drive.

BRIEF SUMMARY OF THE INVENTION

The present invention has been contrived in consideration of these circumstances, and its object is to provide an information writing device capable of accurately writing information in disk-shaped information storage media and a magnetic disk drive provided with magnetic disks loaded with servo information by means of the information writing device.

In order to achieve the above object, an information writing device according to the present invention comprises: a spindle motor; a disk loading hub detachably attached to a rotating shaft of the spindle motor, configured to be rotated by means of the spindle motor, and coaxially fitted with a plurality of disk-shaped storage media arranged at given spaces; a stacked head assembly including magnetic heads for writing information in the disk-shaped storage media mounted on the disk loading hub, the magnetic heads being as many as the storage media and arranged at given spaces from one another; a rotary positioner detachably supporting the stacked head assembly for rotating motion and capable of moving to and locating the magnetic heads of the stacked head assembly in predetermined positions over the disk-shaped storage media corresponding thereto; a plurality of ramps configured to load and unload the magnetic heads with respect to the disk-shaped storage media; and a moving mechanism configured to relatively move the spindle motor, rotary positioner, and ramps in a direction such that the distance between the rotating shaft of the spindle motor and the rotating shaft of the rotary positioner changes.

According to the information writing device constructed in this manner, the disk-shaped storage media are supported and rotated by using the dedicated spindle motor that is independent of a magnetic disk drive, and the information is written by means of the dedicated rotary positioner that supports the magnetic heads. Therefore, the information can be written in the storage media with higher accuracy than in the case where the information is written by means of the magnetic disk drive.

According to the information writing device described above, moreover, information can be simultaneously written in a large number of disk-shaped storage media, so that the processing efficiency can be improved considerably. The disk loading hub can be easily detached from the spindle motor by moving the rotary positioner and the ramps away from the motor. Further, information can be written in disk-shaped storage media of various sizes if the distance between the rotary positioner and the spindle motor is adjusted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An information writing device according to an embodiment of the present invention will now be described in detail with reference to the accompanying drawings. A hard disk drive (hereinafter referred to as HDD) having magnetic disks that are loaded with servo information by means of the information writing device will be described first.

Figure 1:
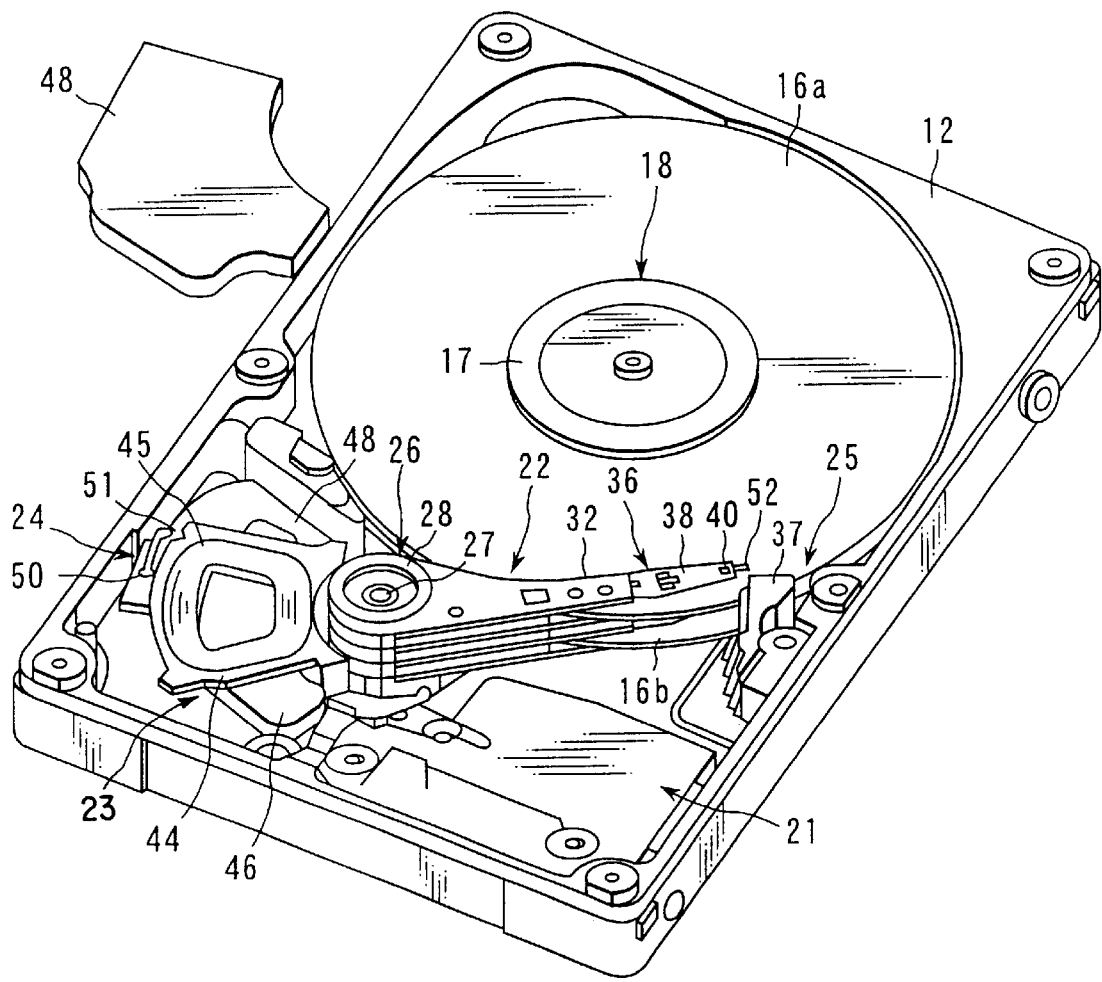
FIG. 1 is a perspective view showing a hard disk drive.
Figure 2:
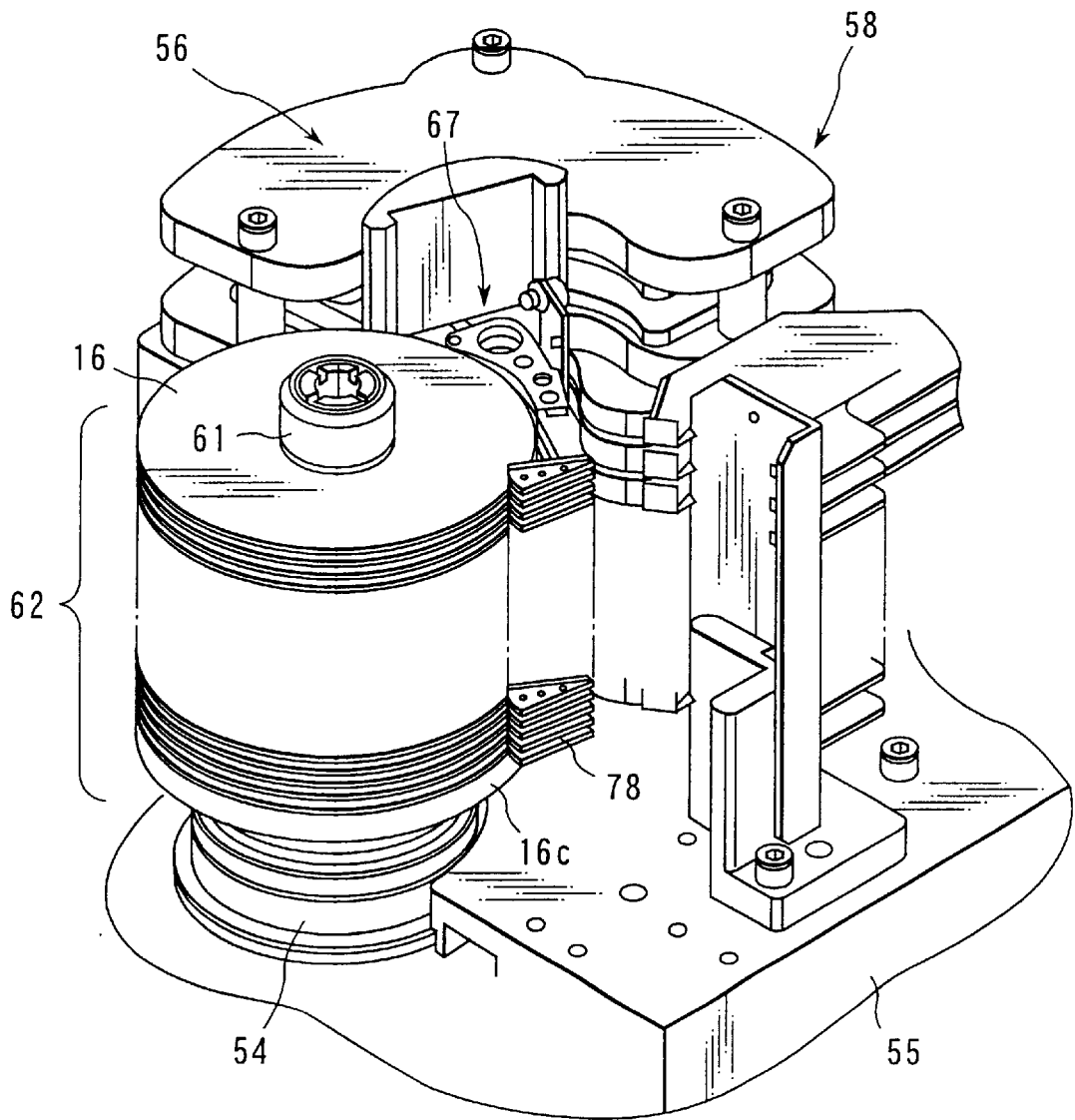
FIG. 2 is a perspective view of an information writing device according to an embodiment of the present invention.
Figure 3:
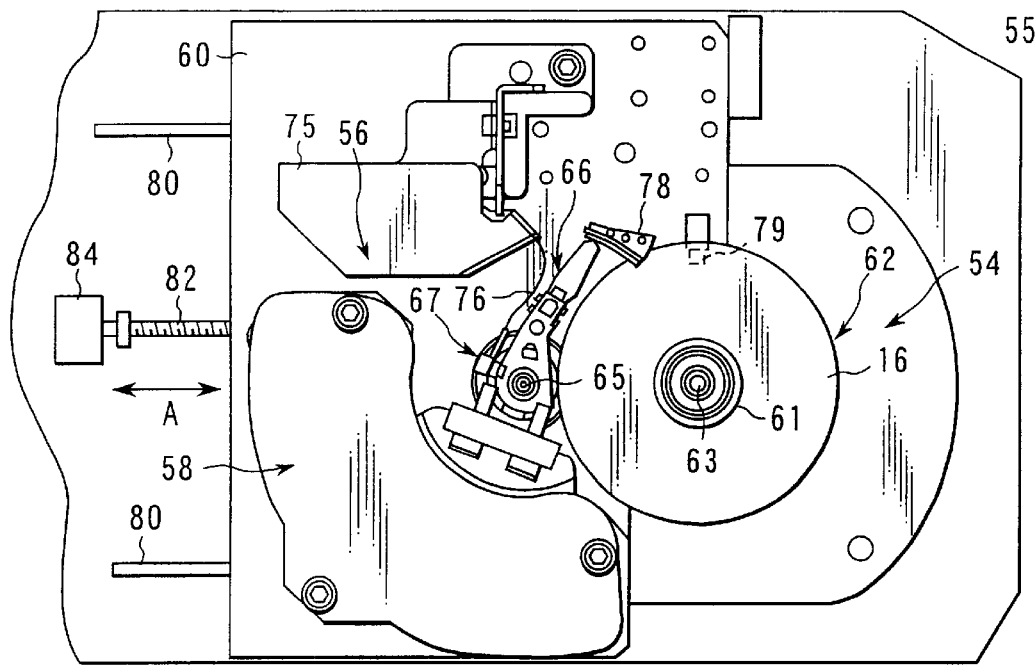
FIG. 3 is a plan view of the information writing device.
Figure 4:
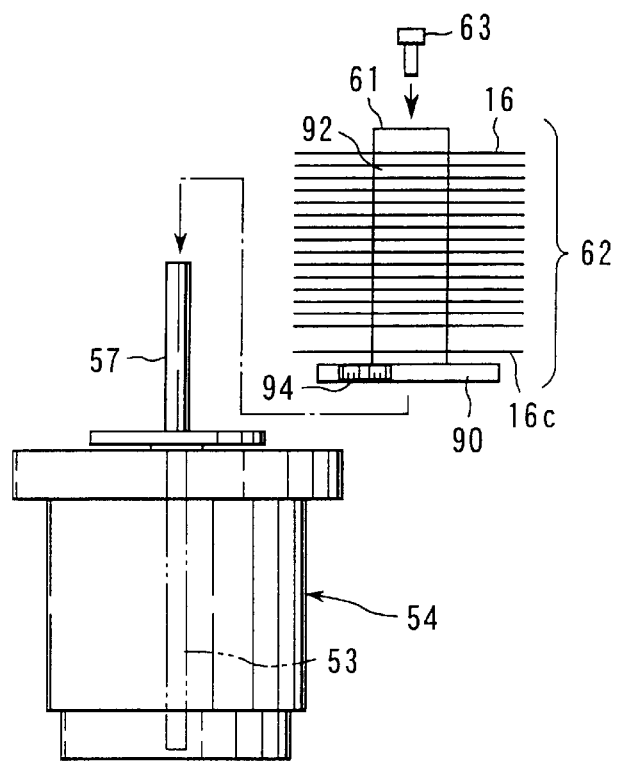
FIG. 4 is a side view showing an air spindle motor and a disk assembly of the information writing device.
Figure 5:
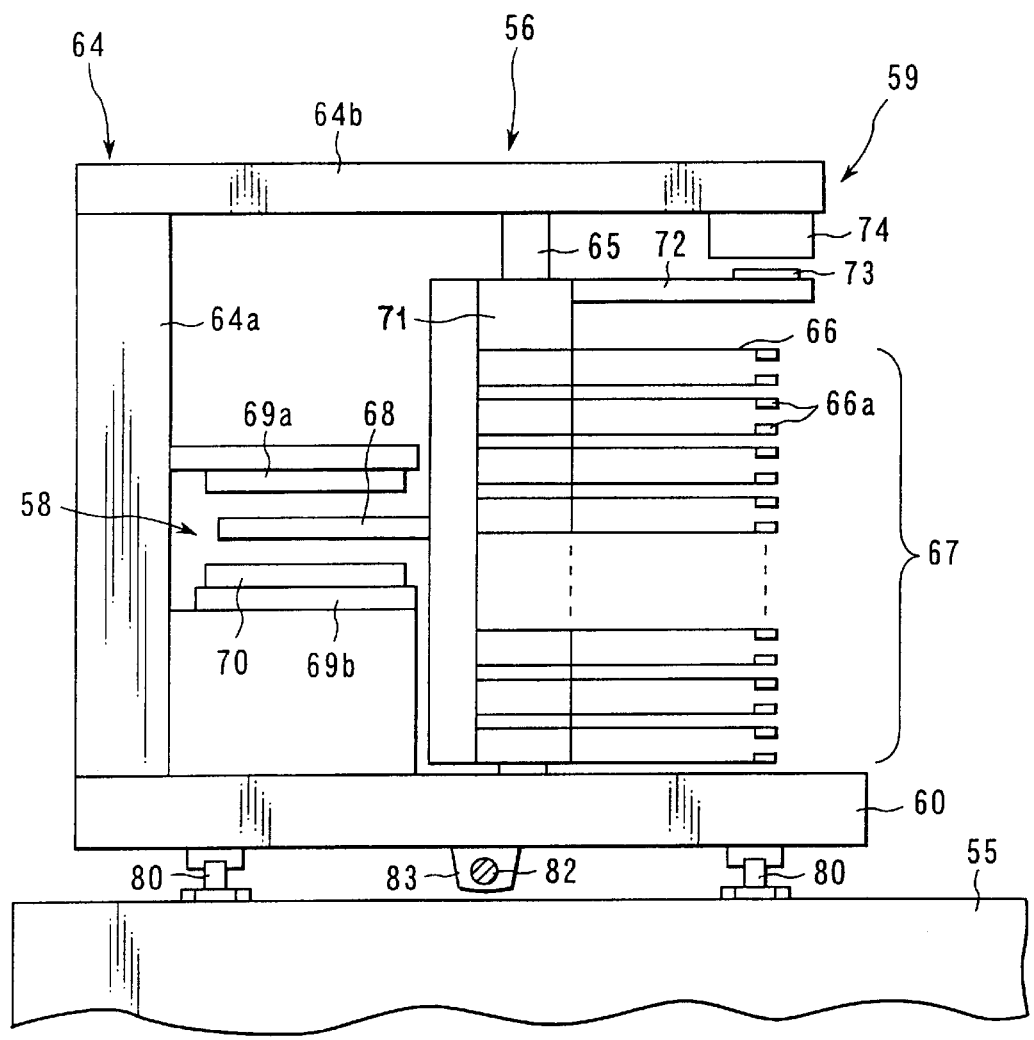
FIG. 5 is a side view showing a movable table and a rotary positioner of the information writing device.

As shown in FIG. 1, the HDD includes a casing 12 in the form of an open-topped rectangular box and a top cover (not shown) that is fastened to the casing by means of screws and closes a top opening of the casing.

The casing 12 stores therein two magnetic disks 16a and 16b for use as magnetic storage media, a spindle motor 18 as drive means for supporting and rotating the magnetic disks, magnetic heads for writing into and reading information from the magnetic disks, and a head actuator 22 that supports the magnetic heads for movement with respect to the magnetic disks 16a and 16b. The casing 12 is also stored with a voice coil motor (hereinafter referred to as VCM) 23 for rotating and positioning the head actuator, a ramp-loading mechanism 25 for holding each magnetic head in a retreated position off its corresponding magnetic disk when the magnetic head is moved to the outermost periphery of the magnetic disk, an inertia latch mechanism 24 for latching the head actuator in its retreated position when the HDD is shocked, for example, and a substrate unit 21 having a head IC or the like.

A printed-circuit board (not shown) for controlling the respective operations of the spindle motor 18, VCM 23, and magnetic heads is screwed to the outer surface of the bottom wall of the casing 12 by means of the substrate unit 21.

The magnetic disks 16a and 16b have a diameter of 65 mm (2.5 inches) and include magnetic recording layers on its upper and lower surfaces. The two disks 16a and 16b are fitted on a hub (not shown) of the spindle motor 18, and are fixedly held by means of a clamp spring 17. Thus, the disks 16a and 16b are coaxially arranged in layers with a gap between them. As the spindle motor 18 is driven, the magnetic disks 16a and 16b are rotated together at a given speed.

The head actuator 22 is provided with a bearing assembly 26 that is fixed on the bottom wall of the casing 12. The assembly 26 includes a pivot 27 set up vertically on the bottom wall of the casing 12 and a cylindrical hub 28 rotatably supported on the pivot by means of a pair of bearings. Further, the head actuator 22 is provided with four arms 32 and a plurality of spacer rings mounted on the hub 28 and magnetic head assemblies 36 supported individually on the arms. The four arms 32 are located parallel to one another at given distances and extend in the same direction from the hub 28.

Each magnetic head assembly 36 is provided with a suspension 38, in the form of an elongate plate capable of elastic deformation, and a magnetic head 40 fixed to the distal end of the suspension. The suspension 38 is formed of a leaf spring, having its proximal end fixed to the distal end of its corresponding arm 32 by spot welding or solvent welding and extending from the arm. Each suspension 38 may be formed integrally with its corresponding arm 32.

As shown in FIG. 1, on the other hand, the head actuator 22 has a support frame 44 that extends from the bearing assembly 26 in the direction opposite from the arms 32. The frame 44 supports a voice coil 45 that constitutes a part of the VCM 23. The frame 44, made of a synthetic resin, is formed integrally with the outer periphery of the voice coil 45. Further, the support frame 44 is formed having a recess 51 that engages a latch claw 50 of the inertia latch mechanism 24.

When the head actuator 22 constructed in this manner is incorporated in the casing 12, the magnetic disks 16a and 16b are situated between two of the arms 32. The four magnetic heads 40 mounted individually on the four suspensions 38 are opposed individually to the respective upper and lower surfaces of the magnetic disks 16a and 16b and hold the disks between them from both sides.

The voice coil 45 fixed to the support frame 44 of the head actuator 22 is situated between a pair of yokes 48 that are fixed on the casing 12, and in conjunction with these yokes and a magnet 46 fixed to one of the yokes, constitutes the VCM 24. If the voice coil 45 is energized, the head actuator 22 rocks, and the magnetic heads 40 are moved onto desired tracks of the magnetic disks 16a and 16b and positioned.

The ramp-loading mechanism 25 is provided with ramps 37, which is provided on the bottom wall of the casing 12 and located outside the magnetic disks 16a and 16b, and tabs 52 that extend individually from the respective distal ends of the suspensions 38. As the head actuator 22 rocks to its retreated position outside the magnetic disks 16a and 16b, each tab 52 engages a ramp surface on the ramp 37, and thereafter, is lifted along the slope of the ramp surface, whereupon the magnetic heads are unloaded.

The following is a description of the information writing device that is used to write servo information, such as track information, position information, etc., in the magnetic disks that are to be incorporated in the HDD constructed in the aforesaid manner.

As shown in FIGS. 2 to 5, the information writing device comprises an air spindle motor 54 provided on a fixed base 55, a disk loading hub 90 having thereon a large number of magnetic disks 16 arranged coaxially with predetermined gaps between them, and a rotary positioner 56 removably supporting magnetic heads that are as many as the disks 16. The rotary positioner 56 is provided on a table 60 that is movable relatively to base 55.

A rod-shaped mounting jig 57 is fixed coaxially to a spindle 53 of the air spindle motor 54 and extends vertically upward from the base 55. A large number of magnetic disks 16, e.g., 25 to 50 in number, to be written with servo information are mounted coaxially with predetermined gaps around the disk loading hub 90. A spacer ring 92 is interposed between each two adjacent magnetic disks. A reference magnetic disk 16c, separate from the magnetic disks 16, is mounted on the lowermost part of the hub 90. The magnetic disks 16, spacer rings 92, and reference magnetic disk 16c are fixed to the disk loading hub 90 by means of a disk retainer 61 that is attached to the upper end of the disk loading hub 90. These elements constitute a disk assembly 62.

The disk assembly 62 is removably mounted on the air spindle motor 54 in a manner such that the disk loading hub 90 is fitted onto the mounting jig 57 of the motor 54 from above and fastened by means of a fixing screw 63 to the jig. The disk assembly 62 is rotated at a given rotational frequency, e.g., 4,200 rpm, by means of the motor 54.

On the other hand, the rotary positioner 56 is provided with a support frame 64 that is fixed on the movable table 60. The support frame 64 includes a raised portion 64a set up vertically on the table 60 and a horizontal extension portion 64b extending from the upper end of the raised portion and opposed parallel to the table 60.

Further, the rotary positioner 56 has a pivot 65, which is set up vertically on the movable table 60 and extends parallel to the spindle 53 of the air spindle motor 54. The upper end of the pivot 65 is supported on the horizontal extension portion 64b of the support frame 64. The pivot 65 supports a cylindrical hub 71 for rotating motion. The hub 71 is detachably fitted with a stacked head assembly 67 that includes twice as many stacked magnetic head assemblies 66 as the magnetic disks 16.

Each magnetic head assembly 66, which is constructed in the same manner as each magnetic head assembly of the HDD, includes an arm and a suspension extending from the hub 71 and a magnetic head 66a attached to the distal end of the suspension by means of a gimbals spring. These magnetic head assemblies 66 are arranged vertically in layers at given spaces in a manner such that each two of them face each other. Each magnetic head assembly 66 is connected electrically to a control substrate unit 75 on the movable table 60 by means of a flexible cable 76.

Further, the rotary positioner 56 is provided with a voice coil motor (hereinafter referred to as VCM) 58 for rotating and positioning the stacked head assembly 67 with respect to the magnetic disks 16 and a laser encoder 59. The VCM 58 includes a voice coil 68 mounted on the hub 71, a pair of yokes 69a and 69b fixed to the raised portion 64a of the support frame 64, and a magnet 70 fixed to one of the yokes. The voice coil 68 and the yokes 69a and 69b extend horizontally, and the coil 68 is situated between the yoke 69a and the magnet 70. The rotary positioner 56 is rotated when the voice coil 68 is energized. The range of rotating motion of the positioner 56 is restricted within a give range by means of a mechanical stopper (not shown). The operation of the VCM 58 is controlled by means of the control substrate unit 75.

The laser encoder 59, which serves as a sensor, includes a support arm 72 extending horizontally from the hub 71, an encoder scale 73 mounted on the arm 72, and an encoder sensor 74 that is attached to the horizontal extension portion 64b of the support frame 64 so as to face the scale 73. The encoder 59 serves to detect the rotated position of the rotary positioner 56.

The movable table 60 carries thereon ramps 78 for loading and unloading the respective magnetic heads 66a of the magnetic head assemblies 66 with respect to the magnetic disks 16. The ramps 78, which are as many as the magnetic head assemblies 66, are arranged vertically in layers at given spaces. Provided on the movable table 60, moreover, is a dedicated magnetic head (clock head) 79 for recording in and reproducing clock signals from the reference magnetic disk 16c of the disk assembly 62.

The movable table 60, which is furnished with the rotary positioner 56, ramps 78, etc., is placed for reciprocation on a pair of parallel guide rails 80 that are laid on the base 55. A moving direction A of the movable table 60 is set so that the spindle 53 of the air spindle motor 54 and the pivot 65 of the rotary positioner 56 can move toward and away from each other. Overlying the base 55, moreover, a feed screw 82 extends parallel to the guide rails 80 and engages a screw guide 83 that is fixed to the underside of the movable table 60. Further, a stepping motor 84 for rotating the feed screw is connected to one end of the feed screw 82.

By driving the stepping motor 84, therefore, the movable table 60 can be moved along the guide rails 80. Thus, the rotary positioner 56, ramps 78, etc. can be moved toward and away from the disk assembly 62, and the distance between the spindle 53 of the air spindle motor 54 and the pivot 65 of the rotary positioner 56 can be adjusted freely. In this manner, the stepping motor 84, guide rails 80, and feed screw 82 constitute a drive mechanism, which, in conjunction with the movable table 60, constitutes a moving mechanism.

The information writing device with the above-described construction is configured to write desired servo information in the magnetic disks 16 in the following manner.

First, in an initial state of the information writing device, the movable table 60 is held in a position such that the pivot 65 of the rotary positioner 56 is distant enough from the spindle 53 of the air spindle motor 54. Further, the stacked head assembly 67 is kept unloaded by means of the ramps 78. On the other hand, the disk assembly 62, which includes a given number of magnetic disks 16 and the reference magnetic disk 16c mounted on the disk loading hub 90, is prepared in advance. The assembly 62 is fixedly mounted on the air spindle motor 54.

Subsequently, the stepping motor 84 is driven to move the movable table 60 toward the disk assembly 62. The table 60 is stopped in a position such that the distance between the spindle 53 of the air spindle motor 54 and the pivot 65 of the rotary positioner 56 is equal to the distance between the spindle of the spindle motor 18 and the pivot 27 of the head actuator 22. In this state, the movable table 60 is fixed by means of an air cylinder (not shown) or the like. At this point of time, the ramps 78 on the movable table 60 are situated slightly overlapping the respective peripheral edge portions of the magnetic disks 16 of the disk assembly 62, while the magnetic head 79 is situated opposite the reference magnetic disk 16c, the lowermost disk.

After the air spindle motor 54 is then actuated to rotate the disk assembly 62 at a given speed, the stacked head assembly 67 is rotated toward the disk assembly 62 by means of the rotary positioner 56, whereupon the magnetic heads 66a are loaded individually onto their corresponding magnetic disks 16. As this is done, the assembly 67 rotated to the position where it engages a stopper on the inner peripheral side, and this position is detected by means of the laser encoder 59 and stored in the control substrate unit 75.

The stacked head assembly 67 is rotated to be located in a preset disk radius position with the stored position as a reference, and servo information is written in the magnetic disks 16 by means of the magnetic heads 66a. Then, the magnetic heads 66a are moved successively to predetermined positions, and servo information for all tracks is written. Thereafter, the stacked head assembly 67 is rotated to the outer peripheral side of the magnetic disks 16, and the magnetic heads 66a are unloaded onto the ramps 78.

After the rotation of the air spindle motor 54 is then stopped, the movable table 60 is moved away from the disk assembly 62 so that the rotary positioner 56 and the ramps 78 are distant enough from the disk assembly 62. In this state, the disk assembly 62 is removed from the air spindle motor 54, and moreover, the magnetic disks 16 are removed from the disk loading hub 90, whereupon a servo information writing process terminates. The magnetic disks 16 having the servo information written therein are incorporated in the HDD.

A plurality of disk loading hubs 90 are provided for one information writing device, and the magnetic disks 16 are arranged in layers on and removed from the hubs 90 by using a dedicated disk stacking device while the servo information is being written. An identification mark 94 (see FIG. 4), such as a bar code indicative of information on the stacked magnetic disks 16 is attached to the prepared disk assembly 62, e.g., one end portion of the disk loading hub 90. If a bar code reading device for reading the identification mark 94, the information writing device, and the disk stacking device are connected to each other by means of a LAN or the like, information on the type of servo information written in the magnetic disks, success or failure in servo information writing, etc. can be controlled.

If the magnetic disks 16 in the disk assembly 62 are increased in number, the overall height of the disk assembly undergoes a substantial variation that is attributable to the variation of the thickness of each magnetic disk. Since the gaps between the magnetic disks 16 and the ramps 78 are very narrow, the aforesaid variation may possibly bring the ramps 78 and the magnetic disks 16 into contact with one another. Accordingly, a plurality of thickness values are prepared for the spacer rings 92 that are arranged between the adjacent magnetic disks 16, and the height of each magnetic disk is measured as the magnetic disks are stacked in layers by means of the disk stacking device. By doing this, spacer rings of suitable thickness values can be selectively used so that the gaps between the magnetic disks enjoy a given accuracy. Thus, by using the magnetic disks that enjoy the same accuracy as the magnetic disks used in the HDD, the disk assembly 62 can be assembled without bringing the ramps 78 and the magnetic disks into contact with one another.

According to the information writing device constructed in this manner, the magnetic disks 16 are supported and rotated by means of the air spindle motor 54, which suffers much less backlash than the spindle motor of the HDD does, and servo information is written by using the dedicated rotary positioner that is positioned by means of the laser encoder 59. Thus, the servo information can be written in the magnetic disks with higher accuracy than in the case where information is written by means of the HDD.

According to the information writing device of the present embodiment, moreover, the servo information can be simultaneously written in a large number of magnetic disks 16, and the required time for the writing operation is equal to the time for writing information in one magnetic disk by means of the HDD, so that the processing efficiency can be improved considerably. In the case where the air spindle motor 54 is used, moreover, the rotational frequency of the magnetic disks can be made higher than that of the magnetic disk of the HDD, so that the servo information writing time can be shortened further. In this case, the rotational frequency for the servo information writing operation can be set independently, so that the mechanical resonance frequency of the magnetic disks can be avoided when information is written.

Since the position of the rotary positioner 56 can be adjusted with respect to the air spindle motor 54, information can be written in magnetic disks of various sizes, and the disk assembly 62 can be easily detached from the air spindle motor.

Since the stacked head assembly 67 can be detached from the rotary positioner 56, it can be washed after it is used for a given period of time or every time the servo information writing operation is finished.

Since the disk assembly 62 includes the dedicated reference magnetic disk 16c for clock signal recording and reproduction, moreover, the existing clock head 79 can be used to generate clock signals even if the magnetic properties of the magnetic disk 16 of the HDD change.

It is to be understood that the present invention is not limited to the embodiment described above, and that various changes and modifications may be effected therein by one skilled in the art without departing from the scope or spirit of the invention. For example, the drive mechanism for the movable table is not limited to the combination of the guide rails, feed screw, and stepping motor, and may be a mechanism of any other type, such as a combination of a guide and an air cylinder. Further, the reference disk is not limited to a magnetic disk, and may be an optical disk of a phase-change type or a magneto-optical disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A servo track writer comprising:
   a spindle motor;
   a disk loading hub detachably attached to a rotating shaft of the spindle motor to be rotated by the spindle motor, and coaxially fitted with a plurality of disk-shaped storage media arranged at given spaces;
   a stacked head assembly including magnetic heads for writing servo information in the disk-shaped storage media mounted on the disk loading hub, the magnetic heads being arranged with given spaces from one another;
   a rotary positioner detachably supporting the stacked head assembly for rotating motion and capable of moving to and locating the magnetic heads of the stacked head assembly in predetermined positions over the disk-shaped storage media corresponding thereto;
   control means for controlling the rotary positioner and the magnetic heads to simultaneously write servo information in the disk-shaped storage media;
   a plurality of ramps configured to load and unload the magnetic heads with respect to the disk-shaped storage media; and
   a moving mechanism configured to relatively move the spindle motor, rotary positioner, and ramps in a direction such that the distance between the rotating shaft of the spindle motor and the rotating shaft of the rotary positioner changes.

2. A servo track writer according to claim 1, wherein the spindle motor is an air spindle motor.

3. A servo track writer according to claim 1, wherein the rotary positioner includes a pivot extending parallel to the rotating shaft of the spindle, a hub rotatably supported on the pivot and detachably fitted with the stacked head assembly, a motor for rotating and positioning the hub, and a sensor for detecting the rotated position of the stacked head assembly.

4. A servo track writer according to claim 1, which further comprises a fixed base fitted with the spindle motor, and wherein the moving mechanism includes a table, movable relatively to the base in a direction such that the distance between the rotating shaft of the spindle motor and the rotating shaft of the rotary positioner changes, and a drive mechanism configured to reciprocate the movable table in the direction, and the rotary positioner and the ramps are provided on the movable table.

5. A servo track writer according to claim 1, which further comprises a disk-shaped storage medium for reference, mounted on the disk loading hub and capable of recording and reproducing clock signals for information writing by means of the magnetic heads, and another head for recording in and reproducing the clock signals from the reference storage medium, the other head being movable together with the rotary positioner and the ramps with respect to the spindle motor.

6. A servo track writer according to claim 5, wherein the disk-shaped storage medium for reference includes any one of a magnetic disk, optical disk, and magneto-optical disk.

7. A servo track writer according to claim 1, wherein the disk loading hub has an identification mark indicating information with respect to the disk-shaped storage medium on the hub.

8. A servo track writer according to claim 7, wherein the identification mark includes a bar code.

9. A servo track writer according to claim 1, which further comprises a plurality of spacers detachably mounted on the disk loading hub and each situated between each two adjacent disk-shaped storage media, each of the spacers having a selected thickness such that the gap between the adjacent storage media has a given value.

10. A magnetic disk drive comprising:

a magnetic disk on which servo information is written by the servo track writer according to claim 1; and a magnetic head configured to be positioned with respect to the magnetic disk in accordance with the servo information and capable of recording in and reproducing information from the magnetic disk.

11. A servo track writer comprising:

a spindle motor;

a disk loading hub detachably attached to a rotating shaft of the spindle motor to be rotated by the spindle motor, and coaxially fitted with a plurality of disk-shaped storage media arranged at given spaces;

a stacked head assembly including magnetic heads for writing servo information in the disk-shaped storage media mounted on the disk loading hub, the magnetic heads being arranged with given spaces from one another;

a rotary positioner supporting the stacked head assembly for rotating motion and configured to simultaneously move the magnetic heads of the stacked head assembly to and locate the magnetic heads in predetermined positions over the disk-shaped storage media corresponding thereto;

a plurality of ramps configured to load and unload the magnetic heads with respect to the disk-shaped storage media; and a moving mechanism configured to relatively move the spindle motor, rotary positioner, and ramps in a direction such that the distance between the rotating shaft of the spindle motor and the rotating shaft of the rotary positioner changes.

12. A servo track writer comprising:

a spindle motor;

a mounting jig coaxially attached to a rotating shaft of the spindle motor;

a disk load hub detachably attached to the mounting jig to be rotated by the spindle motor, and coaxially fitted with a plurality of disk-shaped storage media arranged at given spaces;

a stacked head assembly including magnetic heads for writing servo information in the disk-shaped storage media mounted on the disk loading hub, the magnetic heads being arranged with given spaces from one another;

a rotary positioner detachably supporting the stacked head assembly for rotating motion and capable of moving to and locating the magnetic heads of the stacked head assembly in predetermined positions over the disk-shaped storage media corresponding thereto;

a plurality of ramps configured to load and unload the magnetic heads with respect to the disk-shaped storage media; and a moving mechanism configured to relatively move the spindle motor, rotary positioner, and ramps in a direction such that the distance between the rotating shaft of the spindle motor and the rotating shaft of the rotary positioner changes.

* * * * *